Figure 1:
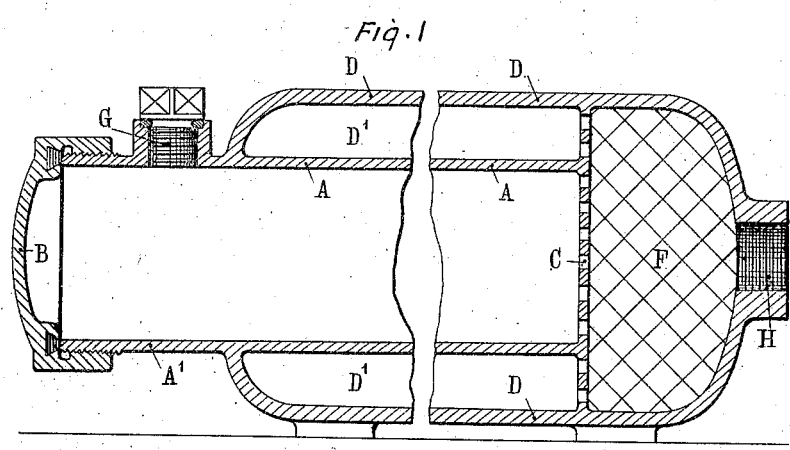

G. F. JAUBERT.
PROCESS FOR THE PREPARATION OF HYDROGEN BY AUTOCOMBUSTION.
APPLICATION FILED JAN. 5, 1911.

1,029,064.

Patented June 11, 1912.

2 SHEETS—SHEET 1.

Witnesses:

Inventor:
George François Jaubert
By Pennie & Goldsborough
Attys.

G. F. JAUBERT.
PROCESS FOR THE PREPARATION OF HYDROGEN BY AUTOCOMBUSTION.
APPLICATION FILED JAN. 5, 1911.
1,029,064.
Patented June 11, 1912.
2 SHEETS—SHEET 2.
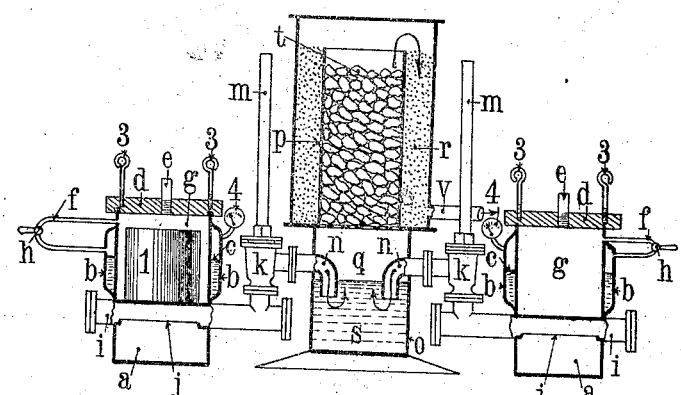
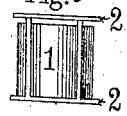
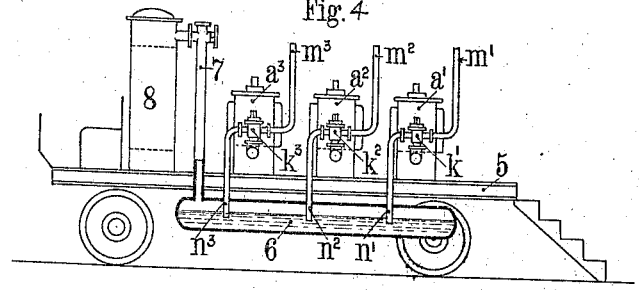
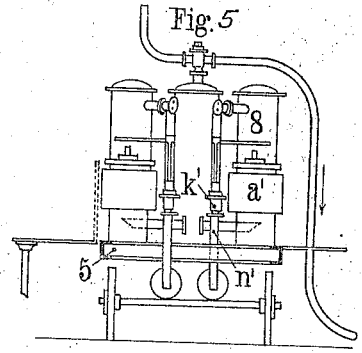
Witnesses:
Inventor:
George François Jaubert
By Pennie & Goldsborough
Attys

UNITED STATES PATENT OFFICE.

GEORGE FRANÇOIS JAUBERT, OF PARIS, FRANCE.

PROCESS FOR THE PREPARATION OF HYDROGEN BY AUTOCOMBUSTION.

1,029,064.  Specification of Letters Patent.  Patented June 11, 1912.

Application filed January 5, 1911. Serial No. 600,859.

*To all whom it may concern:*

Be it known that I, GEORGE FRANÇOIS JAUBERT, of 155 Boulevard Malesherbes, Paris, France, have invented certain new and useful Improvements in and Relating to Processes for the Preparation of Hydrogen by Autocombustion, of which the following is a specification.

This invention relates to an improved method of and apparatus for the preparation of hydrogen by a dry process and by auto-combustion.

A process for the preparation of hydrogen by a wet operation is known which consists in causing a metal (aluminium, zinc or alloys or combinations of these metals) or a metalloid (silicon) to re-act upon an alkaline solution (caustic soda or potash lye, milk of lime, etc.). If, on the other hand these same metals or this metalloid are mixed in the pulverulent and dry state such for example as aluminium, zinc or their alloys, silicon or its combinations with the alkaline or alkaline-earth hydrates such as caustic potash or soda hydrated lime, etc., likewise in powder and in the dry state, no re-action arises. I have discovered that certain of these mixtures (of metals or metalloids and alkaline hydrates) which are absolutely stable when cold decompose of themselves if their mass has been kindled at a spot and that this decomposition takes place with a violent liberation of hydrogen.

The process in accordance with the invention consists in producing the action in a pulverulent and dry state and at a high temperature without the intervention of external heating (kindling the mass at a point) of metals or their alloys such as aluminium, zinc or metalloids or their combinations such as silicon, carbon or mixtures thereof upon alkaline or alkaline-earth hydrates, likewise in the pulverulent and dry state.

The process is most particularly applicable when the bodies in contact combine one with the other directly, that is to say, after simple kindling and without other intermediary.

Practically it often happens that the constituent elements of the mixtures have no affinity or but little affinity for each other and do not combine voluntarily merely as a result of kindling them at a point. In this case the process is somewhat modified in order to render the above process by a dry method, applicable to a whole series of metals, metalloids or alloys, owing to the intervention of an oxidizing agent or comburent. This modified form of the process essentially consists in kindling in a closed vessel a mixture composed of an excess of combustible (metal, metalloid or alloy) and of a comburent or oxidizing agent capable of supporting combustion in the said closed vessel in the presence of water vapor. This water vapor may arise in the mixture itself in which hydrates have been incorporated; that is to say, any aqueous body or body containing hydrogen and oxygen capable of decomposing under heat in liberating water vapor as for example slaked lime, alcoholates, carbohydrates and even water which is nothing other than a perfect hydrate. This water vapor might likewise be supplied wholly or partially from the exterior and be produced wholly or partially at the exterior by any appropriate means and more particularly in utilizing the heat of combustion of the mixtures referred to above for vaporizing the water of a boiler as would be done with an ordinary fuel.

In order to facilitate the explanations which follow, embodiments of apparatus for carrying the process into practice have been represented in the accompanying drawing:

Figure 1 is a sectional view of an apparatus for obtaining compressed hydrogen; Fig. 2 is an apparatus for obtaining hydrogen under a small pressure; Fig. 3 is a detail view; Figs. 4 and 5 are respectively a side elevation and an end view of a portable apparatus.

The apparatus according to Fig. 1 consists of a tube $A$—$A^1$ preferably a weldless tube closed at one of its ends by a screw plug B and provided at its other end with a perforated bottom C. This tube which forms the generator is supported in a casing D which constitutes the gas reservoir $D^1$. The perforated bottom C forms in this reservoir a chamber F serving as purifier and containing a suitable filtering mass. The part $A^1$ of the generator tube $A$—$A^1$ which projects in front of the casing D carries a kindling plug G. The gas outlet is shown at H.

The operation is as follows: A suitably proportioned mixture of one or of several of the metals or metalloids referred to above is prepared in the pulverulent and dry state with one or if desired several of the alkaline or alkaline-earth hydrates mentioned likewise in the pulverulent and dry state, the tube A—A¹ being entirely filled with this mixture; in order to facilitate its introduction the mixture may be packed in a tin cartridge or in an asbestos fabric bag. The screw plug is screwed home and the gas outlet closed. When this has been done the priming and kindling plug G is opened and through the orifice thus formed a ball of iron a match or other suitable material heated to a temperature which may vary between 400 and 500° C. is dropped. The plug is then replaced and screwed home. The reaction starts automatically and extends to the entire mass with great liberation of heat. The hydrogen is liberated, accumulates under pressure in the reservoir D¹ from which it can be taken as required.

The following may be given as examples of mixtures furnishing good results:

*Example I.*

|  | Kgs. |
|---|---|
| Ferro-silicon at 90 to 95% of silicon in an impalpable powder | 2.500 |
| Hydrated lime in powder | 2.000 |
| Caustic soda in powder | 6.000 |

These various ingredients after being intimately mixed give a gray powder resembling cement, stable when cold and gradually attracting the humidity of the air. After kindling the reaction is so vigorous that the entire mass is caused to become incandescent; in certain cases an inert material can be added for moderating its violence in accordance with Example II below:

*Example II.*

|  | Kgs. |
|---|---|
| Ferro-silicon at 90 to 95% of silicon in an impalpable powder | 2.500 |
| Caustic soda in powder | 8.000 |
| Calcined infusorial earth | 2.000 |

*Example III.*

|  | Kgs. |
|---|---|
| Ferro-silicon at 90 to 95% of silicon in an impalpable powder | 1.500 |
| Wood charcoal in powder | 0.500 |
| Hydrated lime in powder | 2.000 |
| Caustic soda in powder | 6.000 |

The chemical reactions that arise can be represented by the following equations:

With aluminium:

$$Al_2 + 6NaOH = Al_2O_4Na_2 + 2Na_2O + 3H_2.$$

Or in the presence of lime:

$$Al_2 + 2NaOH + 2Ca(OH)_2 = Al_2O_4Na_2 + 2CaO + 3H_2.$$

With zinc:

$$Zn + 2NaOH = ZnO_2Na_2 + H_2.$$

With silicon:

$$Si + 4NaOH = SiO_3Na_2 + Na_2O + 2H_2.$$

Or in the presence of lime:

$$Si + 2NaOH + Ca(HO)_2 = SiO_3Na_2 + CaO + 2H_2.$$

With carbon:

$$C + 4NaOH = CO_3Na_2 + Na_2O + 2H_2.$$

Or in the presence of lime:

$$C + 2NaOH + Ca(OH)_2 = CO_3Na_2 + CaO + 2H_2.$$

In order to obtain the maximum yield of hydrogen, hydrogen containing-substances can be added to the mixture such as the hydrates or bodies containing water of crystallization, crystallized carbonate of soda sulfate of soda sulfate of lime and so forth. It will of course be understood that in the foregoing examples the silicon can be replaced by an equivalent quantity of aluminium or zinc or one of their alloys or of carbon or a mixture of these various simple bodies. Similarly the soda can be replaced by potash or lime or a mixture of these hydrates. The mixtures mentioned can be formed into agglomerates in such a manner as to constitute a commercial product of greater density and more easily handled and sold either in the form of briquets or inclosed in cartridges ready for introduction into the gas generator.

When the constituent elements of the mixture have no or but little affinity for each other, the two following cases may be considered.

*First case.*

Where the water vapor is incorporated directly in the mixture in one of the forms mentioned above the process is carried into practice by preparing a mixture possessing the three following properties:

(1) Of being combustible in a closed vessel.

(2) Of containing aqueous bodies, that is to say, bodies capable of liberating water vapor (metallic hydrates, compounds containing water of hydration, of constitution, of interposition, carbo-hydrates, etc.).

(3) Of containing a metal or metalloid one of their derivatives or a mixture of the said bodies introduced in excess and capable of decomposing the water vapor at high temperature in liberating gaseous hydrogen.

In order to comply with the first of these conditions the selected substance such, for example as iron in the form of powder, powdered carbon and so forth is mixed with a comburent or an oxidizing agent (such as an oxygenated salt chlorate, or perchlorate of potash or a metallic oxid, oxid of lead, manganese iron) or any other body capable of liberating oxygen and supporting combustion in such a manner as to obtain a mixture in the form of powder stable in a cold state but combustible in a closed vessel in liberating heat.

With iron and chlorate of potash a reaction of the following type is obtained.

$$Fe_2 + KClO_3 = Fe_2O_3 + KCl.$$

With carbon and perchlorate of potash:

$$C_2 + KClO_4 = 2CO_2 + KCl.$$

With silicon and oxid of lead:

$$Si + PbO_2 = SiO_2 + 2PbO.$$

In order to comply with the second of the conditions set forth there should be added to the above calorific mixture a substance capable of liberating water (such as a metallic hydrate in the form of powder like slaked lime $Ca(OH_2)$ for example or a compound containing water of crystallization (such as plaster $$CaSO_4 + 2aq.\ \text{bauxite}\ Al_2O_3 + H_2O,\ \text{etc.})$$

or an alcoholate or a carbohydrate. Finally in order to meet the third condition there is added to the calorific mixture either an excess of combustible (iron, carbon, silicon, etc.) or one of their derivatives, ferro-silicon, ferro-chromium, ferro-borium, ferro-carbon, carbid of silicon, carbid of borium, carbid of calcium, aluminium, manganese or a hydrid such as hydrid of calcium $CaH_2$ hydrid of chromium, etc., which excess of combustible will in a hot state decompose the water vapor and permit of the liberation of hydrogen.

If carbon or a derivative containing carbon is employed there is a risk of the hydrogen being contaminated by carbonic acid gas. This latter can be eliminated either by adding to the mass an excess of alkaline hydrate which will retain the carbonic acid gas or by washing the impure hydrogen after it has been prepared in an alkaline lye. Good results are likewise obtained by replacing the metallic hydrates by metallic alcoholates or poly-alcoholates corresponding to the formula:

$$RO + Me,$$

R being an $CH_3$, $C_2H_5$, etc., group, and Me being a metal. Good results are also obtained by replacing the carbon by a carbohydrate such as flour, sugar, dextrin, cellulose, etc.

The total reaction complying with the three conditions set forth above can be represented for iron, chlorate of potash and lime for example, by the following equation:

$$5Fe + KClO_3 + 4Ca(OH_2) =$$
$$Fe_2O_3 + Fe_3O_4 + 4CaO + KCl + 4H_2.$$

Similar equations are arrived at with silicon, carbon and other metals or metalloids.

The following can be given as examples of mixtures furnishing good results:

*Example I.*

20 kgs. of iron powder.
10 " of slaked lime.
6 " of perchlorate of potash.

A gray powder is obtained which when kindled at a point burns rapidly in giving rise to a violent liberation of hydrogen.

*Example II.*

20 kgs. of ferro-silicon with 75% of silicon.
10 " of litharge.
60 " of soda-lime (⅔rds soda and ⅓rd lime).

*Example III.*

20 kgs. of ferro-silicon with 75% of silicon.
5 " of iron powder.
3 " of wheaten flour.
5 " of lime.
3 " of chlorate of potash.

The auto-combustion of these compositions or powders may take place in metal cartridges which at the same time serve for transporting and packing them and which can be introduced into a suitable generating apparatus at the moment of kindling.

*Second Case.*

In order to carry the process into practice when the water vapor has been partially or wholly introduced from the exterior instead of being incorporated with the mixture, the apparatus represented in Figs. 2 and 3 may be utilized. The apparatus comprises a generator $a$ surrounded by a water jacket $b$, $c$ and closed by a massive cover $d$ provided with a central hole closed by an obturator $e$. A vapor liberating pipe $f$ provided with a cock $h$ places the interior $g$ of the generator in communication with the water jacket $b$, $c$ forming a boiler. At its lower part a pipe $i$ passes through the generator; this pipe presents a downwardly directed aperture $j$ and is provided with a three-way cock $k$; this cock opens into a liberating chimney $m$ and into a pipe $n$ which opens into a gas reservoir $o$ divided by a cylinder $p$ into two compartments $q$, $r$ serving as purifying and drying chambers respectively. The purifying chamber $q$ contains a certain quantity of water $s$ and at its upper part at $t$ a filtering mass such as coke for example. The drying chamber $r$ may be filled with sawdust and is connected with a gas supply pipe $v$. The mixture which serves to liberate the hydrogen is contained in metal cartridges 1 (Fig. 3) comprising a metal frame 2 which facilitates handling them; for the same reason the cover $d$ is provided with handles 3 ending in rings.

The operation is as follows: The cartridges 1 charged with the mixtures referred to above in the examples described under the first case, but from which the substances capable of liberating water may be partially or wholly omitted are introduced into the generator $a$ where they rest upon the pipe $i$; the upper end is removed and the cover $d$ fitted but not bolted so as to avoid the risk of an explosion resulting from excess pressure in the generator. The cover $d$ should be of sufficient weight to normally remain applied to the generator. The pipe $i$ is closed by means of the three-way cock $k$, the mixture contained in the cartridge is then kindled for example by allowing a fusee to fall through the central hole $e$ in the cover which is at once blocked. The combustion becomes propagated in this closed vessel, the water contained in $b$, $c$ becomes heated vaporizes, and when the pressure gage 4 indicate a sufficient pressure, approximately 30 lbs. per square inch, the cock $h$ is opened. The vapor enters the space $g$; encounters the mixture in process of combustion and the liberation of hydrogen commences. As already indicated at the moment of kindling the pipe $i$ has been placed in communication through the cock $k$ with the liberation chimney $m$ and this condition is maintained until a bluish smoke is seen to escape at $m$ which indicates that all the air has been scavenged from the apparatus. The cock $k$ is then turned in such a manner as to establish communication between the generator $a$ and the reservoir $o$ through the pipes $i$ and $n$. The hydrogen is washed and purified in the purifier $s$, $t$, dried in $r$ and then conducted through the gas supply pipe $v$ to the utilization appliances.

In order to obtain a continuous process a number of generators might be grouped around the purifying reservoir $o$; in Fig. 2 two generators are shown.

The apparatus represented in Figs. 3 and 4 is more particularly intended for inflating war balloons in the field. The suitable number of generators $a'$, $a^2$, $a^3$... similar to those in Fig. 2 are arranged upon a carriage 5; they communicate through the pipes $n'$, $n^2$, $n^3$... with a scrubber 6 which communicates through a pipe 7 with a purifying reservoir 8. These figures show at $m'$, $m^2$, $m^3$... the liberation chimneys and at $k'$, $k^2$, $k^3$... the three-way cocks.

The invention thus presents the advantage of permitting of marketing stable products which will keep and which are capable of liberating without manipulation and in very simple apparatus pure hydrogen under pressure. Instead of an iron ball a percussion tube or any other method of kindling can be utilized.

The invention is applicable to all cases where a rapid liberation of hydrogen is required and more particularly for aërostation.

What I claim is:—

1. The herein described process for the preparation of hydrogen by auto-combustion, which consists in causing metals of the kind described to act at a high temperature without external heating upon alkaline hydrates of the kind described.

2. The herein described process for the preparation of hydrogen by auto-combustion, which consists in causing dry and pulverulent metals of the kind described to act at a high temperature without external heating upon dry and pulverulent alkaline hydrates of the kind described.

3. The herein described process for the preparation of hydrogen by auto-combustion, which consists in forming a mixture, stable when cold, of metals of the kind described and alkaline hydrates of the kind described, and then kindling the mixture.

4. The herein described process for the preparation of hydrogen by auto-combustion, which consists in forming a dry pulverulent mixture, stable when cold, of metals of the kind described, and dry and pulverulent alkaline hydrates of the kind described, and then kindling the mixture.

In testimony whereof I have hereunto placed my hand at Paris (France), this twenty-third day of December, 1910.

GEORGE FRANÇOIS JAUBERT.

In the presence of two witnesses:
H. C. COXE,
HENRY SCHWAB.